US012584788B2

(12) United States Patent (10) Patent No.: US 12,584,788 B2
Conforti et al. (45) Date of Patent: Mar. 24, 2026

(54) OPTICAL POWER METER FOR SAFE OPERATION OF OPTICAL WIRELESS POWER SYSTEMS

(71) Applicant: Wi-Charge Ltd., Rehovot (IL)

(72) Inventors: Eyal Conforti, Tel Aviv (IL); Lior Golan, Ramat Gan (IL); Omer Nahmias, Aminadav (IL); Zohar Mills-Levin, Rehovot (IL); Ran Sagi, Tel Aviv (IL); Ortal Alpert, Ness Ziona (IL); Ori Mor, Tel Aviv (IL)

(73) Assignee: Wi-Charge Ltd., Rehovot (IL)

( * ) Notice: Subject to any disclaimer, the term of this patent is extended or adjusted under 35 U.S.C. 154(b) by 130 days.

(21) Appl. No.: 17/773,151

(22) PCT Filed: Nov. 1, 2020

(86) PCT No.: PCT/IL2020/051135
§ 371 (c)(1),
(2) Date: Apr. 29, 2022

(87) PCT Pub. No.: WO2021/084544
PCT Pub. Date: May 6, 2021

(65) Prior Publication Data
US 2022/0364915 A1 Nov. 17, 2022

Related U.S. Application Data

(60) Provisional application No. 62/928,550, filed on Oct. 31, 2019.

(51) Int. Cl.
*G01J 1/42* (2006.01)
*G01J 1/04* (2006.01)
*H02J 50/30* (2016.01)

(52) U.S. Cl.
CPC ........... *G01J 1/4257* (2013.01); *G01J 1/0414* (2013.01); *G01J 1/0474* (2013.01); *H02J 50/30* (2016.02)

(58) Field of Classification Search
CPC ...... G01J 1/4257; G01J 1/0414; G01J 1/0474; G01J 1/0271; H02J 50/30
See application file for complete search history.

(56) References Cited

U.S. PATENT DOCUMENTS

| | | | | |
|---|---|---|---|---|
| 4,842,404 A | * | 6/1989 | Duda | G01J 1/04 356/218 |
| 5,004,338 A | * | 4/1991 | Morrow | G01J 1/0414 219/121.61 |

(Continued)

FOREIGN PATENT DOCUMENTS

| | | |
|---|---|---|
| DE | 8906627 U1 | 8/1989 |
| JP | S59-164922 | 9/1984 |

(Continued)

OTHER PUBLICATIONS

English Translation of JP-2006344844-A Description (Year: 2006).*

(Continued)

*Primary Examiner* — Dominic J Bologna
*Assistant Examiner* — Akbar H. Rizvi
(74) *Attorney, Agent, or Firm* — Maine Cernota & Curran

(57) ABSTRACT

A system for measuring the power of a laser beam, comprising an essentially opaque enclosure, from which the laser beam is directed through an exit aperture. The enclosure contains a beam splitter configured to transmit a major part of the laser beam through the exit aperture, and to reflect a minor part of the laser beam; a diffuser element positioned such that the reflected minor part of the laser beam impinges thereon; at least one detector element in optical communication with the diffuser element, the detector element providing a signal in response to the diffused light of the minor (Continued)

part of the laser beam impinging thereon; and an absorber element positioned such that that part of any light entering the enclosure through the exit aperture and reflected by the beam splitter, impinges on the absorber element, and is essentially absorbed.

15 Claims, 7 Drawing Sheets

(56) References Cited

U.S. PATENT DOCUMENTS

| | | | | |
|---|---|---|---|---|
| 5,329,350 | A * | 7/1994 | Wright | .................... G02B 26/02 |
| | | | | 356/225 |
| 6,442,182 | B1 | 8/2002 | Govorkov | |
| 6,477,192 | B2 | 11/2002 | Govorkov et al. | |
| 9,312,701 | B1 | 4/2016 | Mor | |
| 2001/0028664 | A1 * | 10/2001 | Vogler | .................... H01S 3/223 |
| | | | | 372/55 |
| 2002/0027936 | A1 * | 3/2002 | Govorkov | ........... G03F 7/70558 |
| | | | | 372/57 |
| 2007/0019693 | A1 | 1/2007 | Graham | |
| 2010/0012819 | A1 | 1/2010 | Graham | |
| 2012/0206735 | A1 * | 8/2012 | Rutten | .................. G01J 1/4257 |
| | | | | 356/622 |
| 2014/0092929 | A1 | 4/2014 | Alpert | |
| 2014/0126603 | A1 | 5/2014 | Della-Pergola | |
| 2018/0366993 | A1 * | 12/2018 | Mor | ..................... H04B 10/807 |
| 2019/0207431 | A1 * | 7/2019 | Youn | ....................... H02J 50/60 |
| 2019/0242746 | A1 | 8/2019 | Nejdl | |

FOREIGN PATENT DOCUMENTS

| | | | |
|---|---|---|---|
| JP | S59164922 | A | 9/1984 |
| JP | S63-289782 | | 5/1987 |
| JP | H05234125 | A | 9/1990 |
| JP | 200150859 | A | 2/2001 |
| JP | 2001050859 | A | 2/2001 |
| JP | 2006344844 | A * | 12/2006 |

OTHER PUBLICATIONS

International Search Report and Written Opinion for PCT Appl. No. PCT/IL2020/051135 mail date Feb. 28, 2021, 15 pages.
International Preliminary Report on Patentability for PCT Appl. No. PCT/IL2020/051135 mail date May 12, 2022, 6 pages.
Translation of Office Action in JP application 2022-525155, dated Jun. 4, 2024, 2 pages.
Extended European Search Report in EP Application No. 20883415.0, dated Oct. 17, 2023, 4 pages.

* cited by examiner

OPTICAL POWER METER FOR SAFE OPERATION OF OPTICAL WIRELESS POWER SYSTEMS

RELATED APPLICATIONS

This application is a national phase application filed under 35 USC § 371 of PCT Application No. PCT/IL2020/051135 with an International filing date of Nov. 1, 2020, which claims priority of U.S. provisional patent 62/928,550, with a filing date of Oct. 31, 2019. Each of these applications is herein incorporated by reference in its entirety for all purposes.

FIELD

The present invention relates to the field of safety systems for remote charging of mobile devices, especially for use in preventing excessive exposure to lasers, by providing an accurate power meter for laser-based charging systems.

BACKGROUND

In recent years, many battery-operated mobile systems have been developed, their batteries typically having a capacity of around 1-60 Wh, which allows these devices to operate for hours to weeks before requiring that they be recharged. Charging time for such mobile systems is typically shorter than 12 hours, and hence the charger needs to supply around 1-5 W of electrical power to charge the battery within that time frame. Remote laser charging systems have been developed for such mobile systems, which convert optical power to electrical power and eliminate the need to have the mobile device connected by wire to a power supply while charging. Taking into account conversion efficiency between optical power and electrical power, the optical power of the carrying beam of the optical charging system is typically a few watts.

Ensuring safety is a requirement with remote, laser-based charging systems. Accessible emission limits (AEL) for a class I lasers are defined in the US by a Federal Regulation 21 CFR ~1040 as well in other documents. A Class 1 laser is safe under all conditions of normal use. This means the maximum permissible exposure (MPE) cannot be exceeded when viewing a laser with the naked eye or with the aid of typical magnifying optics (e.g. telescope or microscope). Human exposure to longer than acceptable times, or to powers higher than acceptable power limits, would not allow the system to be classified as a class I laser, rendering such lasers unsuitable for general public use.

Since, according to the above mentioned Regulation, the allowed exposure time for a beam having power of a few watts is short, being of the order of a microsecond or so for a 7 mm Gaussian beam of 1 W at 1060 nm, an efficient active safety system is required to facilitate automatic beam shutdown before exposure time to the laser exceeds the allowed duration. Any such safety system would need to accurately measure the optical power emitted by the transmitter, to ensure safe operation.

Most current laser power transmission systems either do not include a power meter, or include a power meter which may be unsuitable for providing accurate results over prolonged operation of the device. Such prior art systems may not take into account variations in beam shape that occur naturally over time, variations in wavelength, or variations in optical properties of the system itself. They are therefore not reliable enough to ensure safe operation over a long time.

For example, the system described in US 2007/0019693 for "Wireless power beaming to common electronic devices" to D. S. Graham uses a photodiode (28) to measure the back-reflection from a lens. This method is power efficient, as it only uses light which would have been wasted otherwise since it would not have reached the receiver and would not have been converted to electrical power at the receiver. However, the photodiode would be sensitive to lens misalignment, dust, wavelength changes (since the lens is generally has a dielectric coating, such coatings being known to be sensitive to wavelength changes), and would not provide a reliable measurement over time without recalibration. It would also be very sensitive to illumination of the photodiode from extraneous sources.

US 2014/0126603 by Della-Pergola, having a common inventor and commonly owned by the present applicant, also uses a leaking mirror to direct the beam towards a single photodiode. This design may also be susceptible to dust, misalignment, and beam shape changes, especially since a lens is used in some of these configurations. U.S. Pat. No. 9,312,701 for System for optical wireless power supply", having common inventors with the present application, suggests detecting objects in the beam based on detecting power loss in the beam. US 2014/0092929, also having a common inventor and commonly owned by the present applicant, suggests monitoring the beam's power and shape to ensure safety.

Many safety systems rely on measurement of the laser power emitted from the transmitter. Current technology suggests the use of a power meter to measure laser power, and sometimes specifies using a "leaky" mirror or reflections from lens surfaces for coupling some of the light to a photodiode, but fails to provide a system capable of maintaining accurate calibration of the power meter over a long time, thereby requiring frequent recalibration to allow safe operation.

There therefore exists a need for a long-term, accurate and reliable power meter to ensure safety of remote optical charging systems which overcomes at least some of the disadvantages of prior art systems and methods.

The disclosures of each of the publications mentioned in this section and in other sections of the specification, are hereby incorporated by reference, each in its entirety.

SUMMARY

The present disclosure discloses a safety system for a laser-based wireless power transmission system that would ensure safe operation over a long time with minimal power loss, by using a power measuring module which ensures a reliable and accurate optical power measurement over a long period of time without the need for recalibration and/or cleaning.

The power measurement systems described in the current disclosure provide longer term reliability, safety, and maintenance-free operation, over the more traditional approaches which prefer high efficiency and low-cost. The systems differ from previous systems in that rather than positioning the detector in a direction and position such that both reflected laser light and stray light from the environment can readily impinge upon it, the detector is placed near the exit aperture of the laser, but facing the laser, such that extraneous light entering the enclosure will be absorbed by the walls of the enclosure and will not impinge upon the detector. In addition, the currently disclosed power meters describe a number of factors providing stability to the power measurement, with low power loss to the main beam and without loss of range. These factors comprise resilience in terms of changes in beam mode, wavelength, temperature, degradation of optical components and changes in transmittance and reflection, dust accumulation on optical and electronic surfaces, biasing of the measurements by internal reflections ("ghosts") from the main beam, and biasing of the measurement by external illumination.

There is thus provided in accordance with an exemplary implementation of the devices described in this disclosure, a system for measuring the power of a laser beam, comprising an essentially opaque enclosure, from which the laser beam is directed through an exit aperture, the enclosure comprising:

(i) a beam splitter configured to transmit a major part of the laser beam through the exit aperture, and to reflect a minor part of the laser beam;

(ii) a diffuser element positioned such that the reflected minor part of the laser beam impinges thereon;

(iii) at least one detector element in optical communication with the diffuser element, the detector element providing a signal in response to the diffused light of the minor part of the laser beam impinging thereon; and (iv) an absorber element positioned such that that part of any light entering the enclosure through the exit aperture and reflected by the beam splitter, impinges on the absorber element, and is essentially absorbed.

In such a system, the laser may be disposed in the enclosure, or outside the enclosure and directing its beam into the enclosure Furthermore, the optical coupling efficiency of the detector to the laser may be substantially greater than the optical coupling of the detector to any other location outside the enclosure.

Additionally, the form of the wavefront of the major part of the beam transmitted by the beam splitter, should essentially be unaffected by passage through the beam splitter.

In any of the above described systems, the ratio of power transmitted by the laser beam to the power received by the detector element should essentially be fixed when the wavelength of the beam is changed by up to 3 nm from its mean value. Furthermore, the ratio of power transmitted by the laser beam to the power received by the detector element should be essentially fixed when the polarization of the beam is changed from its mean value. Additionally, the ratio of power transmitted by the laser beam to the power received by the detector element should essentially be fixed when the beam profile of the beam is changed from its mean value.

In any of these systems, the beam splitter may comprise a transparent front surface and an anti-reflective back surface. Additionally, the diffuser element may be configured to equalize the signal from the beam across the beam profile. The diffuser element may have a concave shape adapted to illuminate the detector element homogeneously.

With regard to the detector element, it may comprise a pair of adjacent detectors positioned such that the detected beam impinges on both of them. In such a case, if the laser beam is generated by a laser diode, the pair of detectors should be arranged such that the fast axis of the laser beam is parallel to the line joining the centers of the detectors.

Finally, in all of these systems, the major part of the laser beam transmitted through the exit aperture may be greater than 80% of the source laser beam.

BRIEF DESCRIPTION OF THE DRAWINGS

The presently claimed invention will be understood and appreciated more fully from the following detailed description, taken in conjunction with the drawings in which:

DETAILED DESCRIPTION

Figure 1:
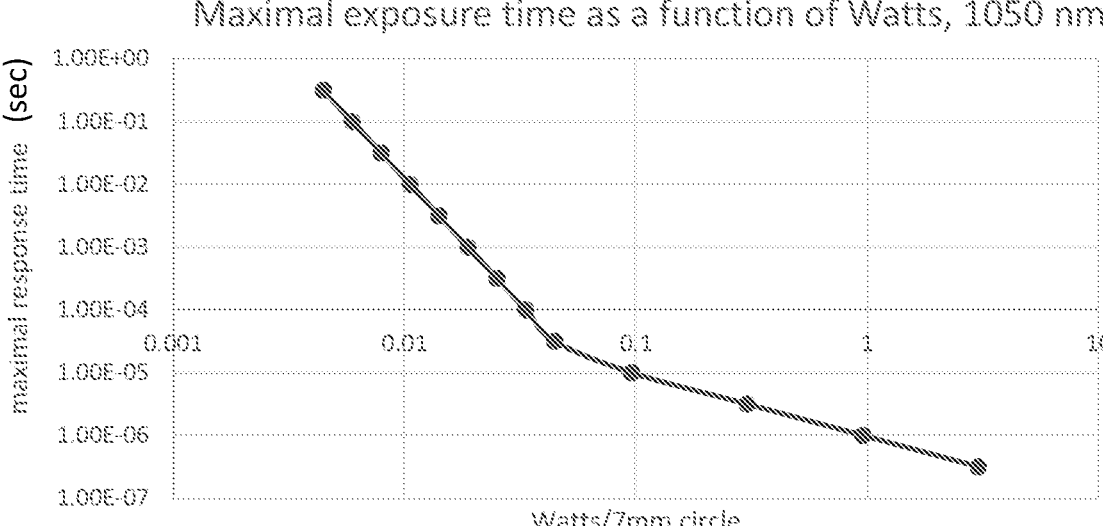
FIG. 1 shows how maximal allowable exposure time declines as a function of power for a beam of 1050 nm wavelength and a diameter of 7 mm.

Reference is first made to FIG. 1, which is a graph showing the maximal allowable exposure time to a beam of 1050 nm wavelength and a diameter of 7 mm, showing the decline in allowable exposure time as a function of the beam power.

Figure 2A:
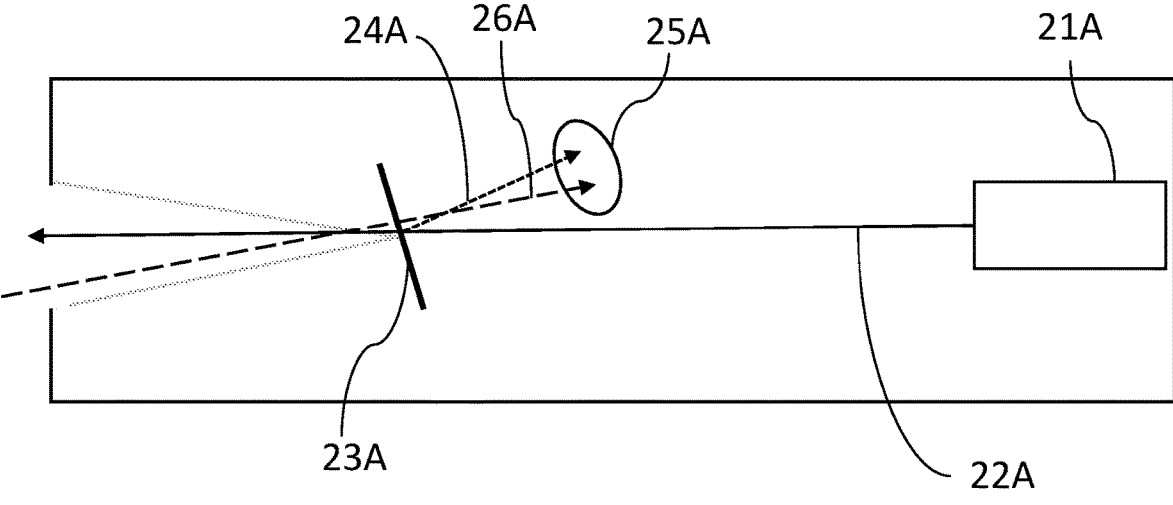
FIGS. 2A and 2B show some differences between a prior art beam splitter and detector, and that disclosed in the current description.

Reference is now made to FIG. 2A, which shows a prior art beam transmission system, illustrating how a beam splitter is used to reflect a small portion of the emitted laser beam into the reverse direction to its direction of propagation, and toward a detector for providing a signal supposedly proportional to the output power. Typically, some 98% of the beam is transmitted, and 2% of the laser light is reflected backward to impinge on the detector. However, because the detector is facing the aperture through which the majority of the laser light is transmitted, incident light from the environment, entering the aperture also impinges on the detector, and thus may falsify the measurements obtained.

Many prior art systems suffer from a design problem that make them susceptible to interference from external illumination, in that they place the power measurement sensor in what is known as the reverse or backward direction rather than in the forward direction.

The so called, "backward direction of the laser" is any direction in which the efficiency of transmission from the laser to the power meter or photodiode, is smaller compared to the efficiency of transmission from at least one point outside the transmitter, for wavelengths to which the power meter is sensitive.

The so called "forward direction of the laser" is defined as a direction in which the efficiency of transmission from the laser 21B to the power meter or photodiode, is greater compared to the efficiency of transmission from any point outside the transmitter, for wavelengths to which the power meter is sensitive.

Thus, in the backward direction, the coupling of light coming from outside the system to the detector 25A is greater than coupling of the optical reflected laser 21A to the detector. For example, a leaky back mirror is often used for power measurement. The back mirror of a laser is designed to have a high reflection for the specific laser wavelength, and is typically transmissive for other wavelengths that, when coming from the outside, would falsify power measurement. In the case where the power meter is placed behind the back mirror of the laser, approximately 0.1% of the laser light may be coupled to the detector, while as much as 5% of light from the outside may be coupled to the laser. In order to measure the power of the laser, a small portion of the beam is split off and directed toward a power meter or detector. The configuration of the detector relative to the laser, and the angle of the splitter, both impact the accuracy of the detector. US 2007/0019693 to Graham measures the back reflection from a lens surface using the lens back surface as the splitter. In US 2014/0126603, Della Pergola uses the back mirror of the laser as a coupler for power measurement (also in the "backward" direction). In this case, the laser back mirror is the beam splitter.

Shown in FIG. 2A is a power meter constructed according to the previously used technology with the detector 25A in a backwards direction. The beam splitter 23A is positioned such that the laser beam 22A is split by the splitter, and a small percentage of the beam 24A is reflected backward and reaches the detector 25A, the main part of the laser beam being emitted from the exit aperture. However, in addition, stray light 26A coming from outside reaches the detector 25A through the exit aperture, affecting the measurement and reducing its accuracy. This arises because the detector is facing the backward direction relative to the laser, i.e. in a direction with its back to the laser, and facing the external world.

Figure 2B:
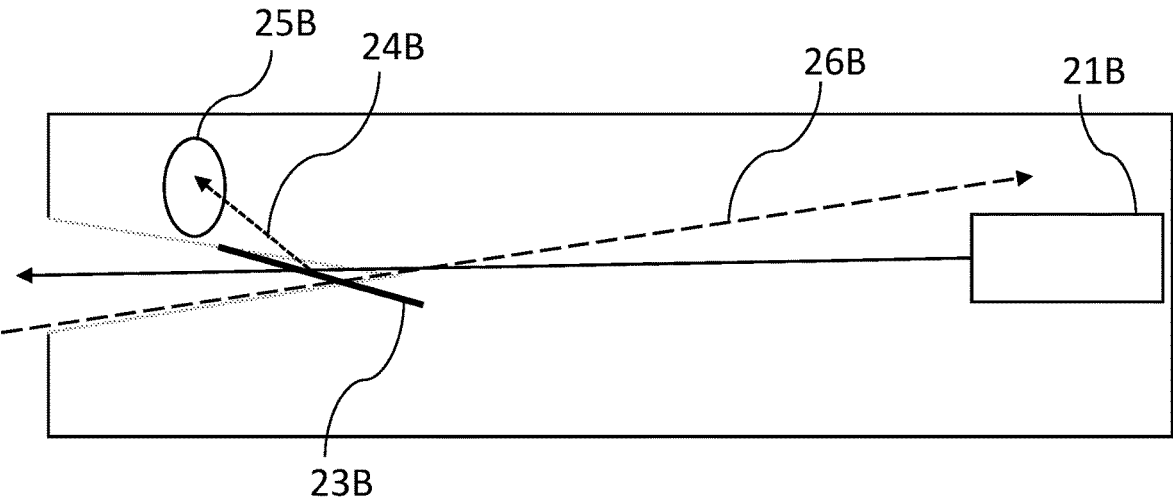

In FIG. 2B, there is shown an exemplary power meter constructed according to a novel solution to the problem of the interference of incident background light. In this configuration, the detector 25B is placed near the exit aperture but facing in the forward direction relative to the laser, i.e. in a direction that faces the laser and has its back to the external world. Thus, stray light that enters the enclosure does not impinge on the detector and therefore does not affect the reading of laser power. In this implementation, the beam splitter may be such that again, 98% of the beam is transmitted and 2% is reflected toward the detector. In this configuration, the detector 25B is positioned such that the 2% of the laser beam, 24B, is deflected after impinging on the splitter 23B and reaches the detector 25B, but almost no power from the stray light beam 26B reaches it.

Although the laser is shown in FIGS. 2B as being contained within the opaque enclosure, it is to be understood that the power meter could also be constructed as a separate device for measuring an externally generated laser beam. In this case, the enclosure would need to have an aperture, with the laser located such that the beam would enter the aperture. In order to reduce entry of extraneous light, the laser should most advantageously be positioned as close to the aperture as possible, or even touching the enclosure wall containing the aperture.

Figure 3:
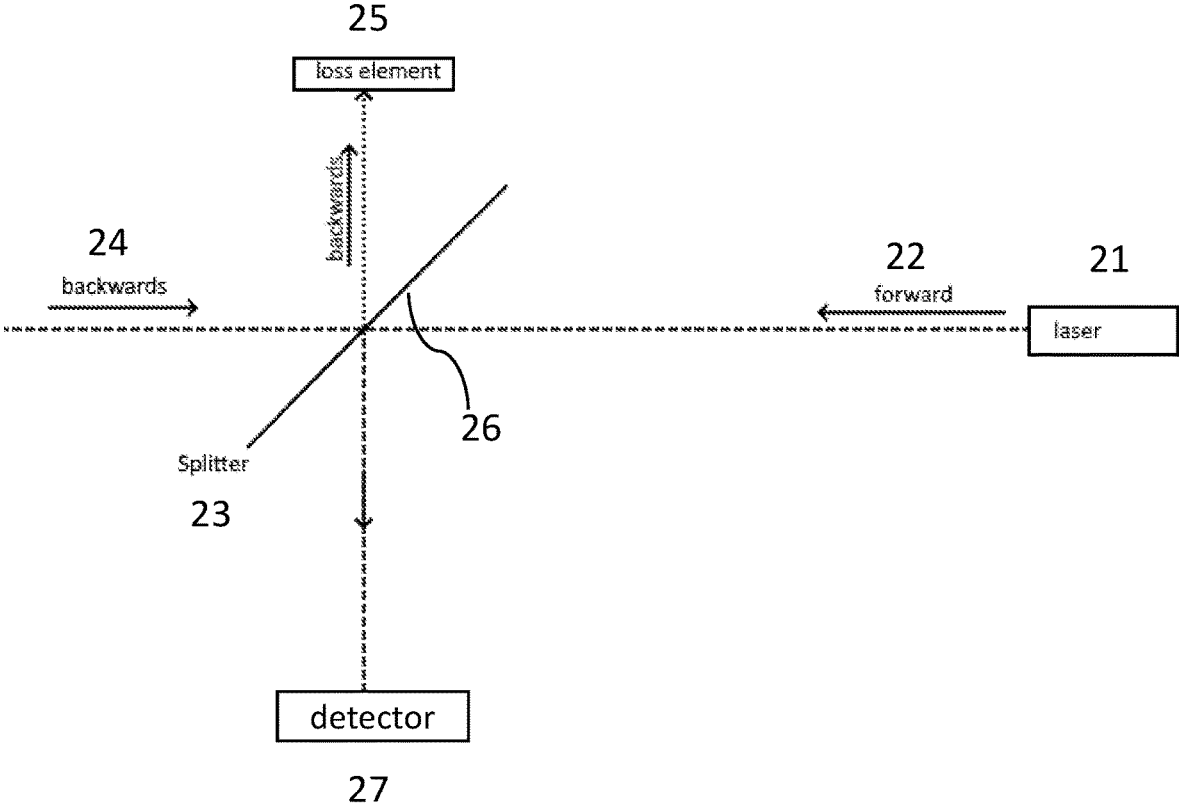
FIG. 3 shows an exemplary system for accurately measuring the power of an optical charging system over a long period of time without recalibration.

Reference is now made to FIG. 3, which shows schematically a beam splitter 26 for use in such a power meter module, designed to separate a small portion of the laser beam traveling from the laser 21 in the forward direction 22 towards the power detector 27. The splitter 26 also diverts light coming from the backwards direction 24, towards a loss element 25, typically a component absorbing wavelengths in the range of the beam, which absorbs most of the reflected beam in order to prevent any significant part of the backward beam from being further reflected towards the detector. As shown in FIG. 2B, these components are sealed in an optically opaque enclosure, to prevent dust accumulation, especially on the splitter 23 and on the loss element 25.

Figure 4:
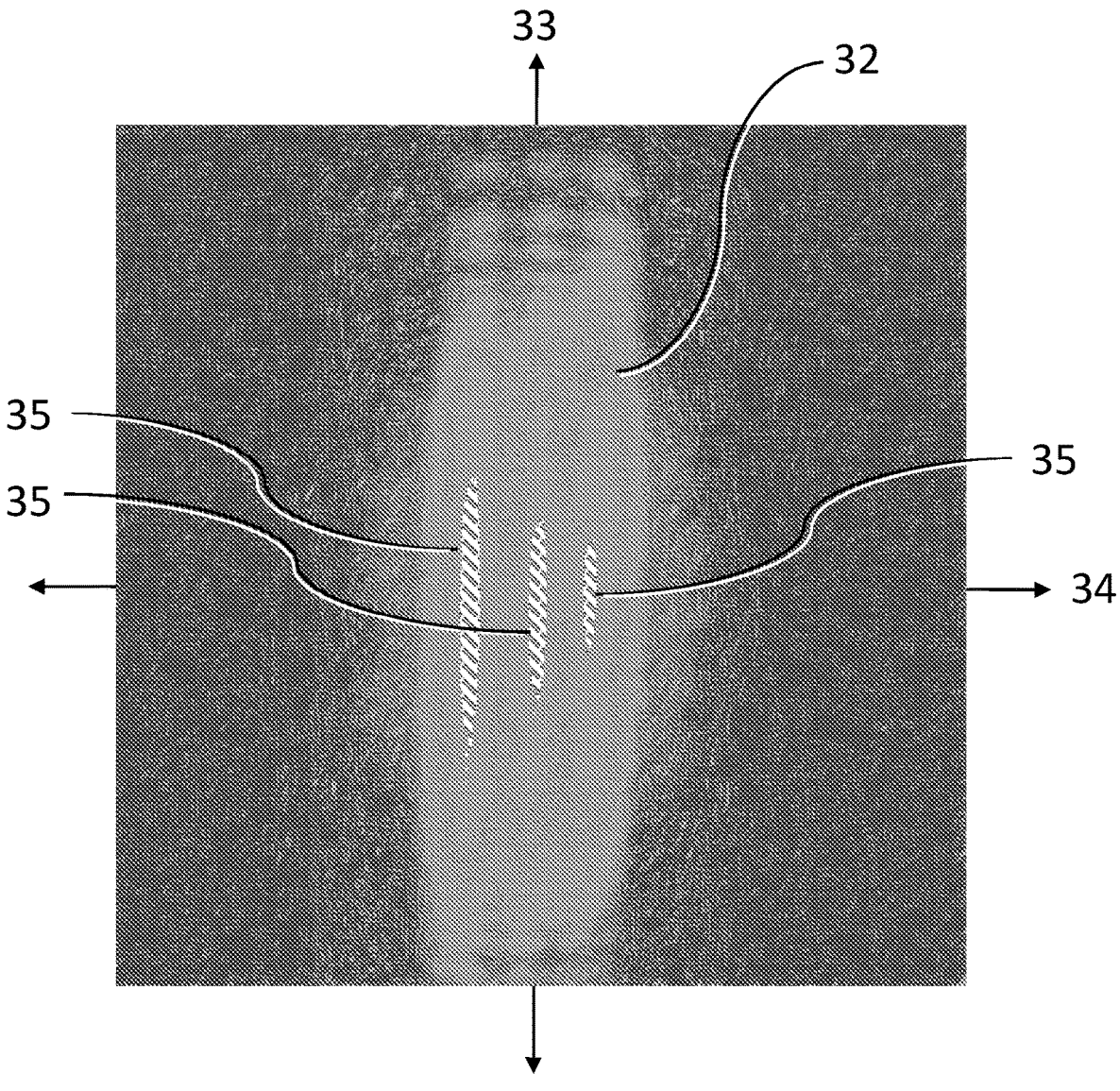
FIG. 4 shows a typical beam profile of a diode laser with variable power across the long and short axes, with hot spots identified.

Laser beams, especially multimode diode laser beams, often experience beam shape changes. FIG. 4 now shows an image of a typical beam shape, which shows the laser beam profile 32, with fast 33 and slow 34 axes marked. The so called "hot spots" shown with diagonal lines 35, often change shape, position, and intensity during the normal operation of the laser, as does the shape of the whole beam 32. In order to avoid such dynamic variations in the shape of the beam from altering the power measurement result, the entire beam must be sampled with uniform efficiency, which has generally been achieved by focusing the entire beam onto the detector. However, such a configuration is sensitive to alignment of the focusing element to the beam and to the detector, and tends to drift over time, requiring realignment or recalibration.

Figure 5:
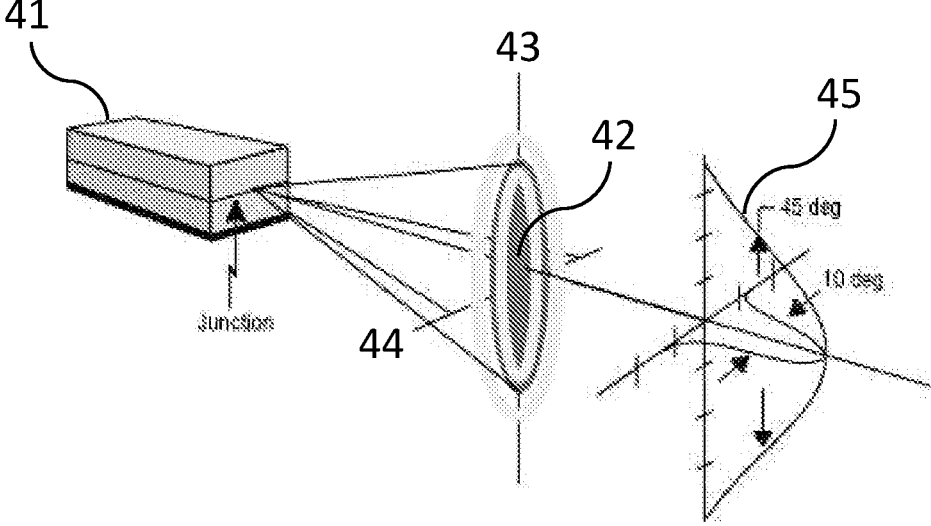
FIG. 5 shows an exemplary laser, illustrating the power variations across long and short axes.

Reference is now made to FIG. 5, which illustrates schematically another view of the axes of a diode laser beam. The beam 42 is emitted from a diode laser 41, either a single longitudinal mode diode laser or a multi-longitudinal mode diode laser. The beam 42 from such diode lasers typically has two different, orthogonal axes 43, 44, behaving differently, the so called fast axis 43 diverging at around 25-50° from the diode emitter, and the slow axis 44 diverging at 5-20° from the diode emitter. The mode across the slow axis 44 is typically much less consistent and much less stable compared to the mode across the fast axis. Thus, a cross section of the beam in the direction of the fast axis 43 is usually close to a Gaussian shape 45 and does not change significantly over time.

Because of the lack of power profile consistency in the slow axis 44, the sampler therefore needs to sample the entire slow axis 44 of the beam with uniform efficiency. Sampling of the fast axis 43 is less sensitive, since the power profile in that direction is more stable, and sampling at any given section will remain representative of the whole beam profile in that direction. Consequently, non-uniform sampling of a portion of the fast axis 43 in space suffices in some cases.

Figure 6A:
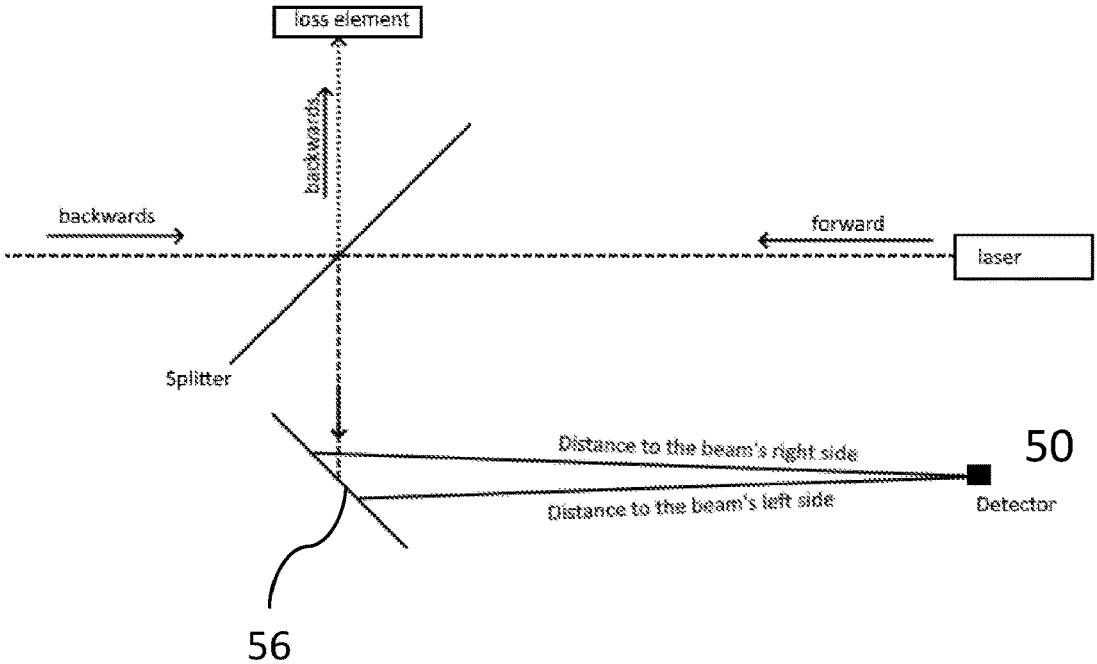
FIGS. 6A and 6B show additional structural components for improving the accuracy of measurements by the power meter.
Figure 6B:
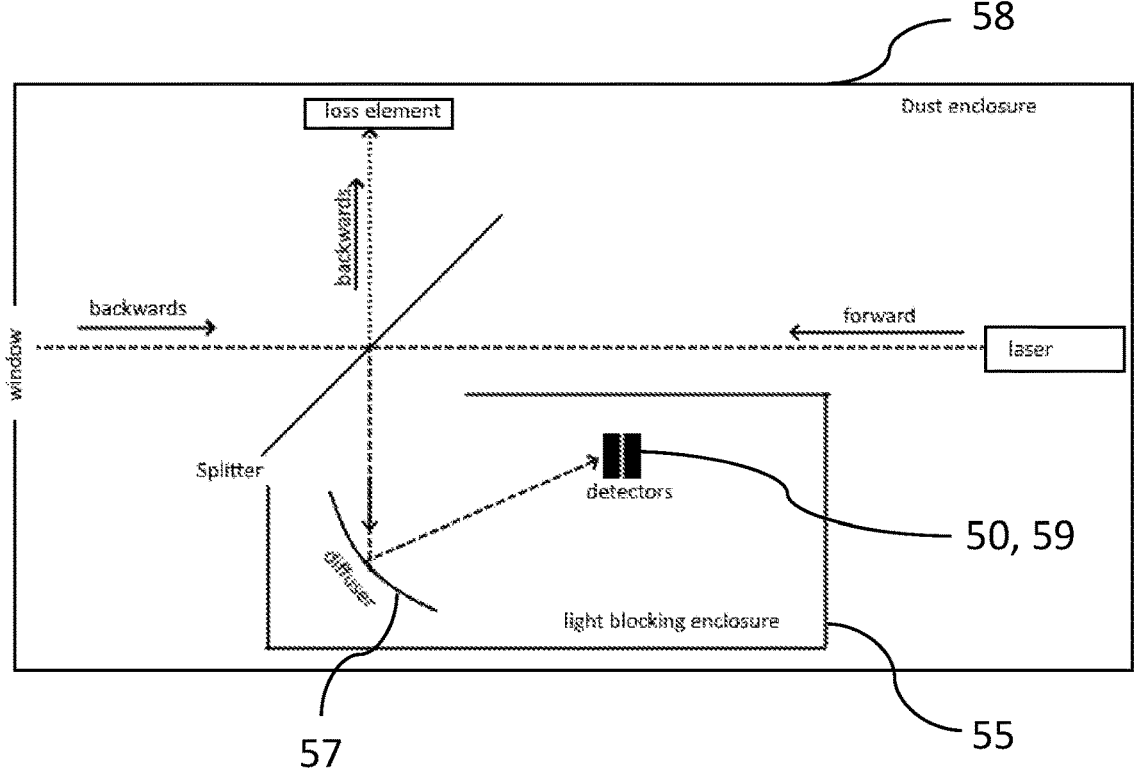

Reference is now made to FIGS. 6A and 6B, which illustrate schematically, a solution to ensure accurate measurement of the beam power. In some cases, it is impractical or impossible to focus the entire beam onto a detector power meter. In such cases, uniform sampling of the split beam is accomplished by having the beam impinge on a diffuser 56, 57 from where the diffused light impinges upon the detectors 50, 59 respectively. The purpose of the diffuser is to ensure that the light collected by the detector is representative equally of each part of the beam falling on the diffuser, such that the sampling ratio is the same for each part of the beam. If the optical path length of the power meter, between such a diffuser 56, 57 and a power detector 50, 59 respectively, is substantially longer than the beam diameter on the slow axis, where a factor of the beam path length being 30 times the beam diameter is considered ample, then a simple diffuser may be used to get a nearly uniform sampling of the whole beam by the power meter. In systems with a shorter optical length of the power meter, the difference in distance between different points on the diffuser and the power meter may cause non-uniform sampling, which in turn may cause sensitivity to beam shape changes. This is illustrated in FIG. 6A, where beams from different sides of the diffuser 56 are shown impinging on the detector 50, and it is clear that in the example shown, the light from the left hand side of the beam will generate a larger signal in the detector, being closer to it, than the light from the right hand side of the beam. If the beam profile shows varying intensity at any given position across its profile, as is true of the slow axis of a diode laser emission, in systems having shorter path lengths than the criterion stated above, this will generate undue dependence on variations in the beam profile.

In many cases, such a long optical path—30 times the beam diameter—may be undesirable for reasons of practicality, and therefore three alternative solutions may be implemented, either separately or together. Firstly, an optical arrangement such as a lens, a focusing mirror or a telescope (not shown in FIGS. 6A and 6B), may be used to compress the optical path so it can fit in a shorter space while maintaining as short as possible the difference between the nearest point in the beam sampled by the diffuser and the furthest point sampled by it. Secondly, a diffuser 56 with a planned variable reflectance or transmittance may be used to compensate for the different distance and angle between different positions in the beam, so that sampling becomes uniform. Thirdly, and as shown in FIG. 6B, a shaped diffuser 57, typically concave in the direction for light incident along the slow axis, or concave for both axes, may be used, so that the optical path length between different points in the beam becomes more equalized. If the detector 50, 59 is placed close to the center of curvature of the diffuser, then the distance from each point in the diffuser to the detector would be the same. Typically, a small deviation from a perfect circular aperture would allow for a uniform off axis illumination of the diffuser by the beam. These three solutions may be used together, or separately; a person of ordinary skill in the art of optical design would know how to design and build such systems and combinations thereof. Implementation of a combination of these three features thus achieves resilience towards beam mode changes.

As shown in FIG. 6B, it is advantageous to use a pair of detectors 50, 59, instead of a single detector element. The detectors are placed so that the line connecting them is optically parallel to the direction of the fast axis of the laser diode. Thus the two detectors, even if slightly off center to the center of the diffused beam, generate similar signals. This is illustrated more clearly in FIG. 7. These similar signals may be used to provide warning if the system is going out of calibration, since the two signals will begin to differ, thereby enabling the performance of a corrective action to prevent dangerous operation, such as reducing power levels, terminating the beam, and/or calling a technician.

The implementation of diffuser-based detection schemes generally utilizes only a small fraction of the overall solid angle for collecting light by the optical detector, as light is spread in many directions away from the diffuser. Thus, an extension to any of these configurations is obtained by implementing a multiplicity of such detectors within the diffused beam, providing multiple simultaneous power indication signals. The lack of dependence of all these signals on the properties of the original beam, other than power, ensures that these signals need be calibrated with respect to each other only once, and this calibration holds despite variations of the beam profile. Specifically, in the case of a cylindrical diffuser, the multiple detectors can be located along the cylinder axis.

Another typical aspect of the present systems is the importance of sealing from dust, as is shown in FIG. 6B. Accumulation of dust on the sampler as well as on other elements in the beam's path may lead to altered sampling ratios and hence inaccurate measurements of beam power. To avoid such a dust problem, the system may be sealed, for example by a dust enclosure 58, or by elongating and complicating the air path between the outside and the inside using a labyrinth air path, to prevent dust from reaching the sampling system. The diffuser 57 and detectors 50, 59 may be further enclosed within a light-blocking enclosure 55, so that any random light entering the module will have a reduced effect on the accuracy of the sampling measurements.

Figure 7:
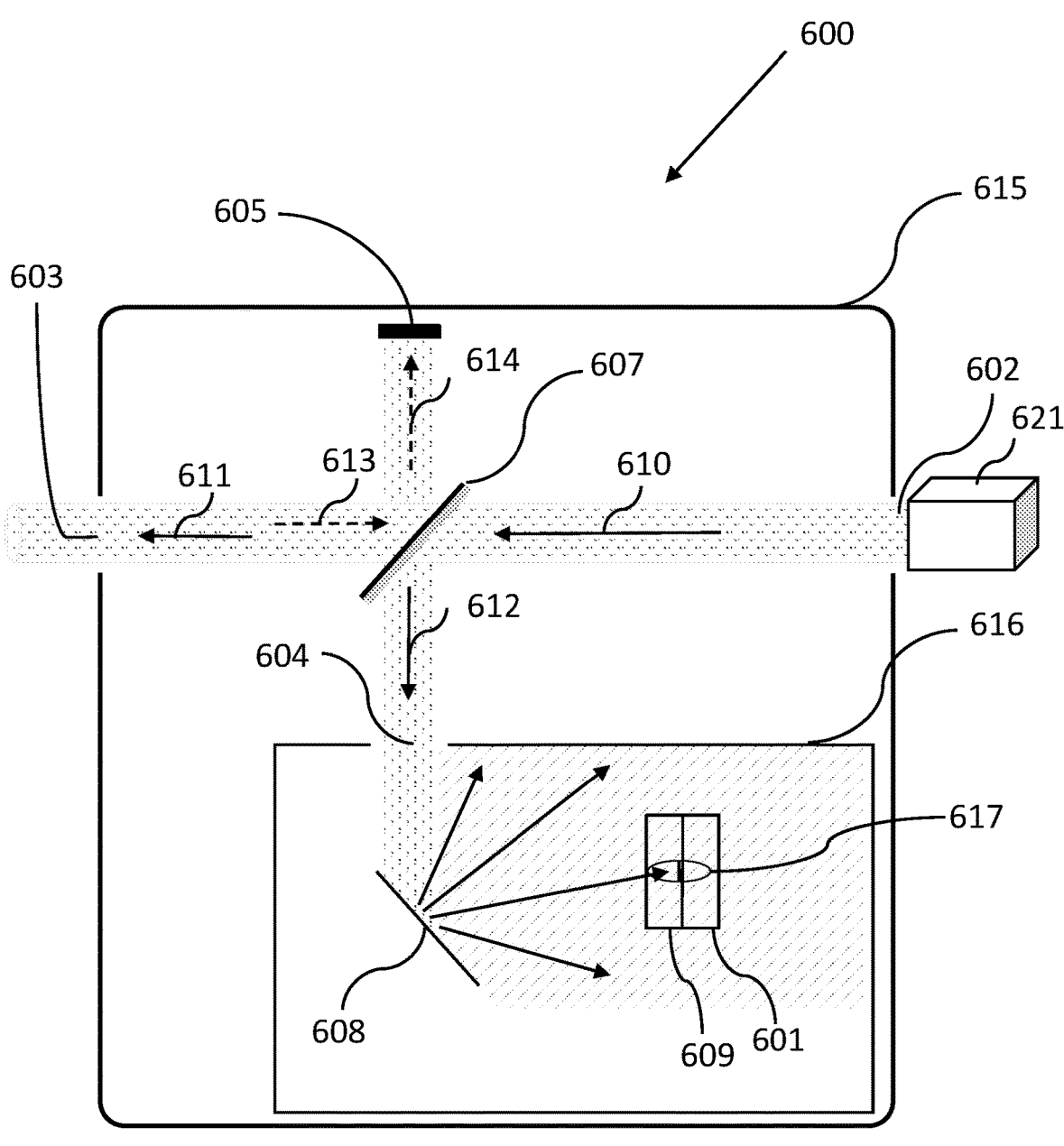
FIG. 7 shows components of the power meter in an exemplary implementation.

Reference is now made to FIG. 7, which shows schematically one exemplary scheme for tracking the power of an optical beam 610 coming from a laser source 621, located in this exemplary arrangement, outside of the enclosure 615 of the power meter, with the beam entering through an entrance aperture 602. the laser, could however, be located within the enclosure, as shown in the example system in FIG. 2B. As in the previous implementations, use is made of a beam splitter 607 in order to deflect part of the incident beam towards the detectors 601, 609. In this module, 600, the beam 610, is split by the splitter 607 into main beam 611 directed out of the exit aperture 603 towards the receiver and a smaller sampled portion 612 which constitutes a known small fraction of the total laser beam. The beam sample 612 enters a light-blocking enclosure 616 through aperture 604, where it impinges on a diffuser element 608. The diffuser element 608 may be spherical, cylindrical, or another shape that facilitates scrambling the wavefront of the impinging beam, such that the direction of each photon is random, or nearly so, relative to the other photons. A portion of the scattered beam impinges on the pair of detectors 601, 609, in a manner such that the fast axis of the beam 617 is parallel to the line joining the centers of the two detectors, with the slow axis along the direction in which the detectors are adjacent to each other. In this configuration, both detectors cover the full length of the slow axis, such that both equally cover the possible noisy random changes in the beam profile along that direction, while the more stable Gaussian profile along the fast axis can be covered in part by each detector, since each part remains reasonably stable in time.

A cylindrical diffuser works best if the spatial distribution of the original beam is asymmetric in the two axes of the incoming beam, for example when using a multimode edge-emitting diode laser. The curved axis of the diffuser as shown in FIG. 6, 57, is aligned with the axis of the beam that is characterized by stronger spatial variations; in FIGS. 3 and 4, this is the slow axis 34, 44 respectively, of the laser. Both detectors then convert the optical signal to electrical signals and provide a measurement of the power of the signal. This information is then used in safety determination.

In FIG. 7, there is shown a part of the main optical beam 611 being reflected back towards the power meter, and this light 613 enters the system from the outside through aperture 603. The spurious light entering the aperture 603, could also be ambient light from a source other than a reflection of the laser beam. This entry light 613, impinges on beam splitter 607, and a portion of the impinging light is reflected as beam 614 and impinges upon a beam absorber 605. The beam absorber 605 prevents reflected beam 614 from being further reflected inside the enclosure 615 surrounding and enclosing the components of the system 600.

Using a configuration such as that shown in FIG. 7, the resulting electrical signal at the detector pair 601, 609, is largely insensitive to properties of the original beam, other than its power. Such other properties include, but are not limited to, polarization, wavelength and spatial distribution. Solutions proposed in the prior art for measuring power typically suggest using low coupling coefficients in the splitter. Typical coupling coefficient values of <0.5% or even <0.2% of the power, are possible using a dielectric coating for coupling out the light at the splitter, and additional losses typically occur, especially in the diffuser, but also in other parts. Although dielectric splitters are usable, they do have a number of disadvantages: Lasers, especially diode lasers, experience longitudinal mode hops and types of wavelength changes, which result in small shifts to their wavelength, and/or bandwidth over time. Dielectric coatings are sensitive to wavelength changes, and as such, using a dielectric coating results in a system that may be sensitive to these wavelength changes, thus becoming unsafe. Wavelength-tolerant dielectric coatings are available, but are more costly.

On the other hand, Fresnel reflections from metallic surfaces are typically much less sensitive to wavelength changes. In the presently described systems, the use of a splitter which is based on Fresnel reflection, or on metallic surface reflection instead of the traditional dielectric coating splitter, is more advantageous. In some implementations, the surface of the splitter opposite to that on which the output beam is split, may be coated with anti-reflection coating. A polka-dot metallic coating may also be used in some implementations, specifically for use with higher powered or large beams.

A first preferred sampler uses Fresnel reflection from the front facet of the typically transparent optical surface of the splitter 607, i.e. the facet facing the laser beam. The rear facet is typically anti-reflection coated to prevent reflections from it, although embodiments reflecting from both surfaces may be advantageous in some situations, especially if the sampler is thin and its faces are slightly off-parallel. The sampler is spatially consistent across the area covered by the beam, thus reducing sensitivity to variations in beam shape; such a structure is highly suitable for sampling fixed polarization beams that have a fixed wavelength.

The sampling angle is chosen so that the Fresnel reflection samples a small portion of the beam 610. Small angles, typically between 0% and 75% of Brewster's angle, have the advantage of being independent of polarization. Larger angles, between 75% and 120% of Brewster's angle, are more sensitive to polarization but allow for higher transmission (especially of the "P" polarization) and thus provide higher efficiency. Angles close to 45° typically allow for the most compact structure, which may be advantageous when a compact system is desired. In one advantageous embodiment, the dominant polarization is set as the "P" polarization in the sampler axes, thus the sampling ratio at an incidence angle of ~45° is small (~1-1.3%) relative to the sampling at angles closer to 0°, where sampling ratio is typically between 3-5%. In this manner, resilience towards wavelength and polarization changes is achieved.

The detection apparatus in the present invention thus includes a diffusing element 608, followed by an optical detector 601, 609, that collects light from only a fraction of the solid angle of the diffused beam. The diffusing element can be either transmissive, in which the diffused distribution is generated along the original direction of the beam, or reflective, in which the distribution is generated via reflection off a diffusive facet. FIG. 7 shows the latter case. A perfect diffuser generates a universal Lambertian distribution, that does not depend on the polarization or wavelength of the sampled beam. Since a fixed solid angle of this distribution is collected by the optical detectors and converted to a power indication signal, this indication signal is also insensitive to the polarization and wavelength of the sampled beam. A practical diffuser is chosen such that residual dependence on polarization and wavelength is negligible with respect to the required accuracy of the power tracking system.

In one embodiment, the optical detectors 601, 609, are positioned at a sufficiently large distance from the diffuser, that the entire diffuser area essentially shares the same distance and angle with respect to the detector. Such a geometry ensures that all the coordinates of the diffuser contribute equally to the power indication signal, hence this signal is insensitive to the spatial distribution of the original beam. In practice, for a given lateral extent of the sampled beam, the detection distance is chosen such that residual geometrical differences yield negligible sensitivity with respect to the required accuracy of the power tracking system.

The amount of light being collected by the optical detector, hence the magnitude of the associated power indication signal, is determined by the collection solid angle, which in turn depends on the detection distance and the detector area. In another embodiment, the detector area is determined by a pinhole aperture placed right above a slightly larger photodetector. Such a design masks areas of the detector that are unintentionally photosensitive, hence providing an active area of accurate size. Typical diameter of such a pinhole can be, though is not limited to, 300 μm. In another implementation the detector area is sufficiently large that the effect of unintentional incidental photosensitivity does not impact the accuracy of the power tracking system. In yet another embodiment the unintentional photosensitivity is characterized as part of the expected signal.

In another implementation, the sampled beam is focused onto the diffuser, thus significantly reducing its lateral extent. Such a design enables reducing the detection distance, hence resulting in a more compact system, without sacrificing the immunity of the power indication signal to spatial distribution of the original beam.

In yet another implementation the diffuser has a spherical profile; a simple implementation of such an element is a spherical diffusing reflector. When placing the optical detector at the origin of this sphere, all the diffuser points share the same distance with respect to the detector, regardless of the detection distance, which in this case is the sphere radius. Thus, lack of dependence on the spatial distribution of the original beam is guaranteed for any detection distance.

The detectors/sensors are best positioned away from the focal point of the curved diffuser (cylindrical or spherical), which is typically found at one half of the radius of curvature from the diffuser's surface. Depending on the mechanical design, the broad beam generated by the diffuser may hit certain mechanical elements and be reflected, either specularly or diffusively, towards the optical detector. This contribution increases the power indication signal beyond the value that is expected by direct collection only. In a preferred embodiment, all the potential mechanical reflectors are placed at a distance such that their contribution to the power indication signal is negligible. In another embodiment, baffles are placed for blocking indirect collection paths; these are shutters whose own reflection cannot reach the detector. In yet another embodiment, relevant mechanical elements are coated with absorbing material in order to minimize their contribution to the power indication signal. Such coating can be, for example, Metal Velvet™ as available from Acktar Advanced Coatings Ltd., of Kiryat Gat, Israel.

It is appreciated by persons skilled in the art that the present invention is not limited by what has been particularly shown and described hereinabove. Rather the scope of the present invention includes both combinations and sub-combinations of various features described hereinabove as well as variations and modifications thereto which would occur to a person of skill in the art upon reading the above description and which are not in the prior art.

We claim:

1. A system for measuring power of a laser wireless power transmission beam emitted from a laser, the system comprising:

an essentially opaque enclosure, from which the laser beam is directed to a remote receiver through an exit aperture open to the outside environment, the enclosure comprising:

a beam splitter configured to transmit a major part of the laser beam through the exit aperture, and to reflect a minor part of the laser beam towards at least one detector element, the at least one detector element providing a signal in response to the minor part of the laser beam impinging thereon; and an absorber element positioned such that light entering the enclosure from the outside environment, through the exit aperture and reflected by the beam splitter, impinges on the absorber element, and is essentially absorbed, wherein the at least one detector element is positioned in a direction that is optically directed towards the laser, and that is not optically directed towards the exit aperture, such that either reflected laser light or stray light entering the essentially opaque enclosure from the outside environment, do not impinge on the front surface of the at least one detector element.

2. The system according to claim 1, further comprising a diffuser element positioned in the path of the reflected minor part of the laser beam and before the at least one detector element.

3. The system according to claim 1, wherein optical coupling efficiency of the at least one detector element to the laser is substantially greater than the optical coupling efficiency of the at least one detector element to any other location outside the enclosure.

4. The system according to claim 1, wherein the laser beam is generated by a laser diode, and the at least one detector element comprises a pair of adjacently positioned detectors, such that the minor part of the laser beam impinges on both of the pair, the pair of adjacent detectors being arranged such that the fast axis of the laser beam is perpendicular to the boundary line between the adjacent detectors.

5. The system according to claim 1, wherein the form of the wavefront of the major part of the beam transmitted by the beam splitter, is essentially unaffected by passage through the beam splitter.

6. The system according to claim 1, wherein the ratio of power transmitted by the laser beam to the power received by the at least one detector element is essentially fixed when the wavelength of the beam is changed by up to 3nm from its mean value.

7. The system according to claim 1, wherein the ratio of power transmitted by the laser beam to the power received by the at least one detector element is essentially fixed when the polarization of the beam is changed from its mean value.

8. The system according to claim 1, wherein the ratio of power transmitted by the laser beam to the power received by the at least one detector element is essentially fixed when the beam profile of the beam is changed from its mean value.

9. The system according to claim 1, wherein the beam splitter comprises a transparent front surface and an anti-reflective back surface.

10. The system according to claim 1, wherein the diffuser element is configured to equalize the signal from the beam across the beam profile.

11. The system according to claim 1, wherein the diffuser element comprises a concave shape adapted to illuminate the at least one detector element homogeneously.

12. The system according to claim 1, wherein the outside environment is represented by the external world.

13. The system according to claim 1, wherein the position of the at least one detector element removes the susceptibility of the power measurement to interference from external illumination.

14. The system according to claim 1, wherein the efficiency of transmission from the laser to the at least one detector element is greater than the efficiency of transmission from any point outside the transmitter, for wavelengths to which the at least one detector element is sensitive.

15. A system for measuring power of a laser beam, comprising:

an essentially opaque enclosure, from which the laser beam is directed through an exit aperture open to the outside environment, the enclosure comprising:

a beam splitter configured to transmit a major part of the laser beam through the exit aperture, and to reflect a minor part of the laser beam;

a diffuser element positioned such that the reflected minor part of the laser beam impinges thereon;

at least one detector element in optical communication with the diffuser element, the detector element providing a signal in response to the diffused light of the minor part of the laser beam impinging thereon; and an absorber element positioned such that light entering the enclosure through the exit aperture, and reflected by the beam splitter, impinges on the absorber element, and is essentially absorbed, wherein:

the at least one detector element is positioned in a direction optically facing the laser;

the detector element is aligned such that reflected laser light from the outside environment entering the essentially opaque enclosure through the exit aperture is prevented from impinging on the front surface of the at least one detector element, and the detector element is aligned such that stray light from any point in the outside environment entering the essentially opaque enclosure through the exit aperture is prevented from impinging on the front surface of the at least one detector element.

* * * * *